(12) United States Patent
Le Duc et al.

(10) Patent No.: US 10,858,940 B1
(45) Date of Patent: Dec. 8, 2020

(54) BEARING WITH AN ASYMMETRIC PRESSURE BALANCE GROOVE

(71) Applicant: Hamilton Sundstrand Corporation, Charlotte, NC (US)

(72) Inventors: Zachary Allen Ray Le Duc, Rockford, IL (US); David Wakefield, Loves Park, IL (US); Toby Chris Whitehead, Winnebago, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/443,259

(22) Filed: Jun. 17, 2019

(51) Int. Cl.
*F01C 21/02* (2006.01)
*F16C 17/04* (2006.01)
*F16C 33/10* (2006.01)

(52) U.S. Cl.
CPC .............. *F01C 21/02* (2013.01); *F16C 17/04* (2013.01); *F16C 33/106* (2013.01); *F04C 2240/50* (2013.01); *F16C 2360/00* (2013.01)

(58) Field of Classification Search
CPC ........ F04C 2240/50; F04C 2/08; F04C 15/00; F04C 15/0023; F04C 15/0026; F04C 15/0038; F16C 2360/00; F16C 33/1065; F16C 33/106; F16C 33/107; F16C 17/04; F01C 21/02
See application file for complete search history.

(56) References Cited

U.S. PATENT DOCUMENTS

| | | |
|---|---|---|
| 2,682,836 A | 7/1954 | Orr, Jr. |
| 3,057,303 A | 10/1962 | Lauck |
| 3,171,358 A | 3/1965 | Luack |
| 3,474,736 A | 10/1969 | Lauck |
| 5,252,047 A * | 10/1993 | Joy ..................... F04C 15/0026 418/132 |
| 5,417,556 A * | 5/1995 | Waddleton .......... F04C 15/0026 418/132 |
| 8,998,496 B2 | 4/2015 | Alexander et al. |
| 9,683,565 B2 | 6/2017 | Bredenfeld et al. |
| 2017/0284544 A1* | 10/2017 | Jeetendra ................... F16J 9/10 |
| 2019/0368610 A1* | 12/2019 | Mochiduki ............ F16J 15/104 |
| 2019/0376557 A1* | 12/2019 | Snively ................... F16C 33/08 |

FOREIGN PATENT DOCUMENTS

| | | |
|---|---|---|
| DE | 3605246 A1 | 8/1987 |
| DE | 102015210004 A1 | 12/2016 |
| EP | 0028061 A1 | 5/1981 |
| EP | 3354897 A1 | 8/2018 |
| GB | 1055517 A | 1/1967 |
| WO | 9407030 A1 | 3/1994 |

OTHER PUBLICATIONS

Extended European search report issued in corresponding EP application No. 19210649.0, dated Jun. 30, 2020.

* cited by examiner

*Primary Examiner* — Alan B Waits

(74) *Attorney, Agent, or Firm* — Locke Lord LLP; Scott D. Wofsy; Georgi Korobanov

(57) ABSTRACT

A pump bearing including a top face, a side face peripherally surrounding the top face, a bottom face opposed to the top face, a first bearing bore projecting from the top face to the bottom face, an edge defined where the top face meets the side face, and an asymmetric pressure balance groove defined within a portion of the edge of the top face and the side face defining first depth from the top face.

16 Claims, 4 Drawing Sheets

BEARING WITH AN ASYMMETRIC PRESSURE BALANCE GROOVE

BACKGROUND

Technological Field

The present disclosure relates to a pump bearing, and more particularly to a pump bearing having eccentric seal grooves.

Description of Related Art

Gear pumps typically include a housing or plate that holds a set of intermeshing gears. As the gears turn, fluid moves between the gear teeth and the housing and is expelled from the pump due to the intermeshing of the gears. The gears are attached or mounted to shafts that run axially from the gear faces, and these shafts must run on one or more bearing surfaces.

A conventional bearing arrangement in pumps involves using two separate bearings, one for the drive side and one for the driven side. Such an arrangement can lead to high internal leakages within the pump, which causes inefficiencies in size, and power because of the increased size required to compensate for said internal leakages. This conventional two piece bearing arrangement is also difficult to seal to prevent the internal losses because of the fact that there are two separate pieces touching and any surface discontinuities between the two parts, such as could be caused by a seal, only serves to increase the leakages. A single piece bearing encompassing both the drive and driven side bores has a geometry that is easier to seal. However, the single piece bearing geometry can introduce alignment issues due to the tolerancing on the housing bore and the bearing outer profile. The present disclosure may provide a solution for one of these remaining challenges.

SUMMARY OF THE INVENTION

A pump bearing including a top face, a side face peripherally surrounding the top face, a bottom face opposed to the top face, a first bearing bore projecting from the top face to the bottom face, an edge defined where the top face meets the side face, and an asymmetric pressure balance groove defined within a portion of the edge of the top face and the side face defining first depth from the top face. The top face can be elongated along a primary axis. The top face can include a pair of grooves having a depth greater than the first depth of the asymmetric pressure groove. The pressure balance groove can surround an angular portion of the first bearing bore and an angular portion of the second bearing bore, wherein the surrounded angular portion of the second bearing bore is longer than the surrounded angular portion of the first bearing bore.

The pressure groove surrounding the angular portion of the first bearing bore can extend to 30 degrees with respect to a centerline of the top face in a clockwise direction and the pressure groove surrounding the angular portion of the first bearing bore extends greater than 30 degrees with respect to a centerline of the top face in a counter-clockwise direction.

It is also conceived that the pressure groove surrounding the angular portion of the second bearing bore extends beyond 30 degrees with respect to a centerline of the top face in a counter-clockwise direction, and greater than 30 degrees in a clockwise direction, and the pressure groove surrounding the angular portion of the second bearing bore extends between 2 and 5 degrees further with respect to a centerline of the top face in a counter-clockwise direction than the pressure groove surrounding the angular portion of the first bearing bore extends with respect to the centerline of the top face in the clockwise direction.

The pressure groove surrounding the portion of the second bearing bore can include a tapered end and the pressure groove surrounding the portion of the first bearing bore can include a tapered end. The first bearing bore and the second bearing bore can be centered about a centerline of the top face. The side face can include a seal groove having a constant depth and a seal groove having a variable depth into the side face.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
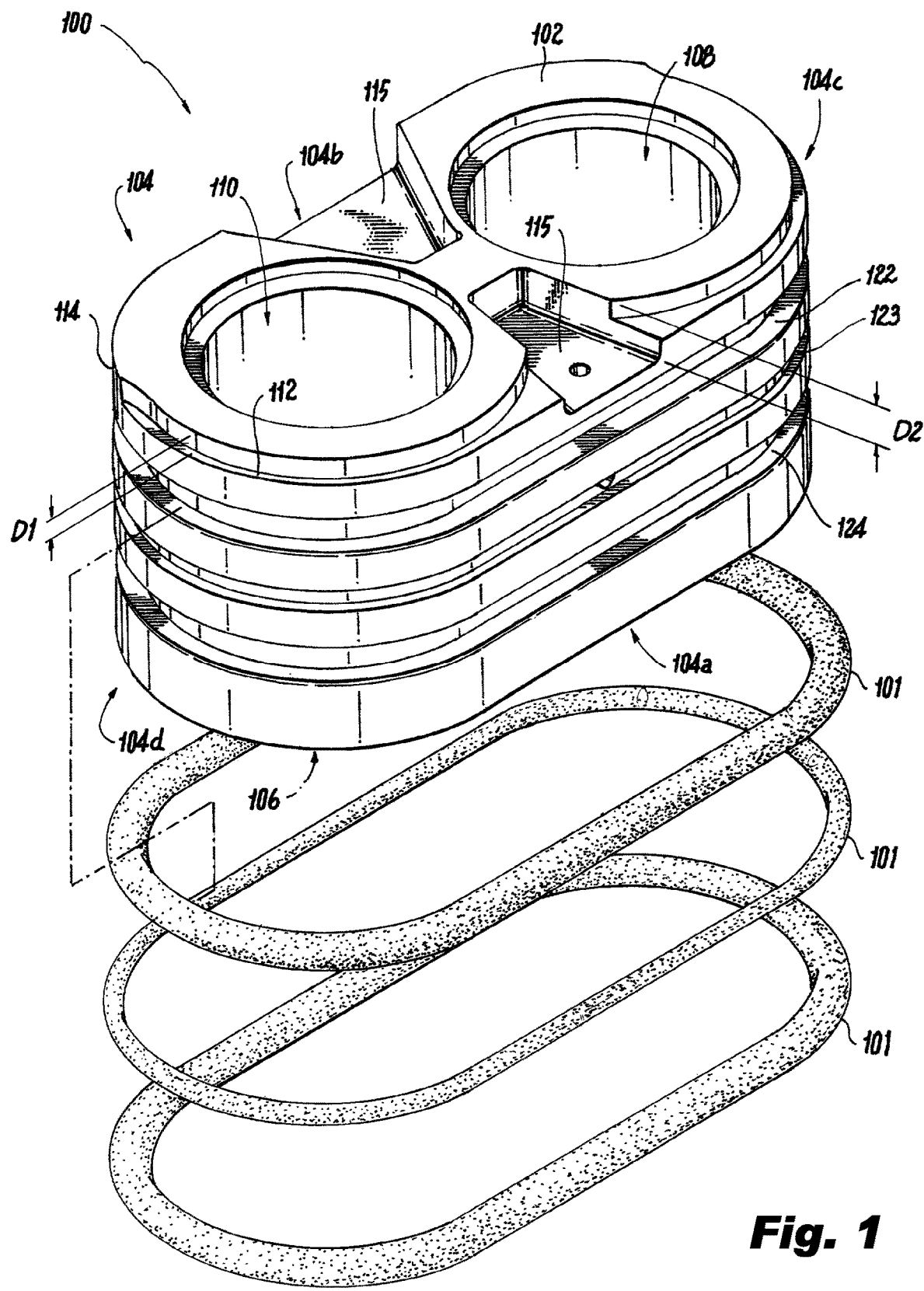
FIG. 1 is a perspective view of a pump bearing.

Reference will now be made to the drawings wherein like reference numerals identify similar structural features or aspects of the subject invention. For purposes of explanation and illustration, and not limitation, a partial view of an exemplary embodiment of a fuel pump bearing in accordance with the invention is shown in FIG. 1 and is designated generally by reference numeral 100. Other embodiments of the fuel pump bearing in accordance with the invention, or aspects thereof, are provided in FIGS. 2-6, as will be described. The methods and systems of the invention can be used to bias the bearing to a housing wall during installation and during operation.

FIG. 1 shows a fuel pump bearing 100, elongated along a primary axis, for use in a gear pump including a top face 102, a side face 104 peripherally encircling the top face 102, a bottom face 106 opposed to the top face 102, a first bearing bore 108 projecting from the top face 102 to the bottom face 106 configured to contain a drive-side shaft, a second bearing bore 110 to contain a driven-side shaft. The side face 104 includes a first straight section 104a and a second straight section 104b opposing the first straight section 104a, and a pair of opposing rounded sections 104c/d connecting each of the straight sections 104a/104b.

Figure 2:
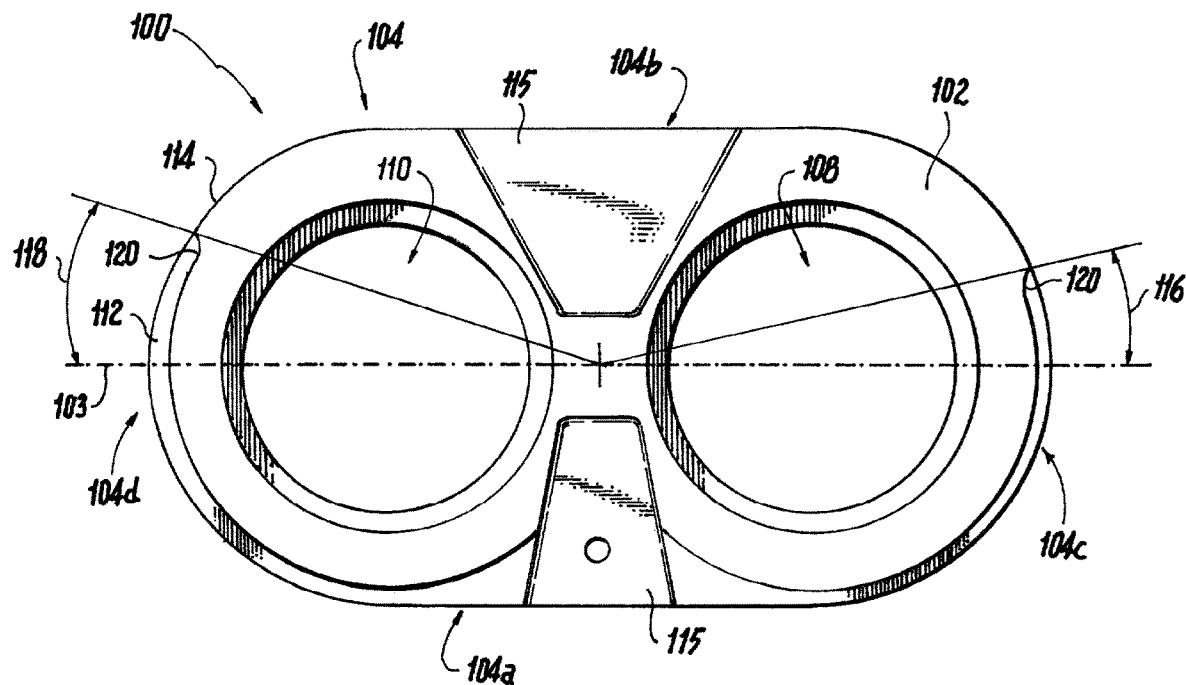
FIG. 2 is a top view of FIG. 1, showing the asymmetric pressure balance groove.

Referring to FIG. 2, an asymmetric pressure balance groove 112 defined within a portion of the edge 114 of the top face 102 and the side face 104 defining first depth D1 from the top face 102. The top face 102 includes two recesses (inlet and discharge sides) 115 having a depth D2. The depth D2 of the recesses which may be greater than, less than, or equal to the first depth D1 of the asymmetric pressure groove 112. The pressure balance groove 112 surrounds an angular portion 116 of the first bearing bore 108 and an angular portion 118 of the second bearing bore 110, wherein the surrounded angular portion 118 of the second bearing bore is longer than the surrounded angular portion of the first bearing bore 116. The pressure groove surrounding the angular portion 116 of the first bearing bore extends to approximately 30 degrees with respect to a centerline 103 of the top face 102 in a counter-clockwise direction and extends greater than 30 degrees with respect to the centerline 103 in a clockwise direction. The degree to which the pressure groove 118 extends can be extended according to the requirements of the application. The pressure groove surrounding the angular portion of the second bearing bore 118 extends beyond 30 degrees with respect to the centerline 101 of the top face 102 in a clockwise direction and greater than 30 degrees in the counter-clockwise direction. Further, the pressure groove surrounding the angular portion of the second bearing bore 118 extends between 2 and 5 degrees further with respect to the centerline 101 in the clockwise direction than the pressure groove surrounding the angular portion of the first bearing bore 116 extends with respect to the centerline 110 in the counter-clockwise direction. The pressure groove surrounding the portion of the second bearing bore 118 includes a tapered end 120 and the pressure groove surrounding the portion of the first bearing bore 116 includes a tapered end 120. It is also considered that the ends 120 could include a 90° cut, a radius, a chamfer style. The asymmetrical groove results 112 in hydraulic loads that are used to ensure a contact point between the pump bores 108,110.

Figure 3:
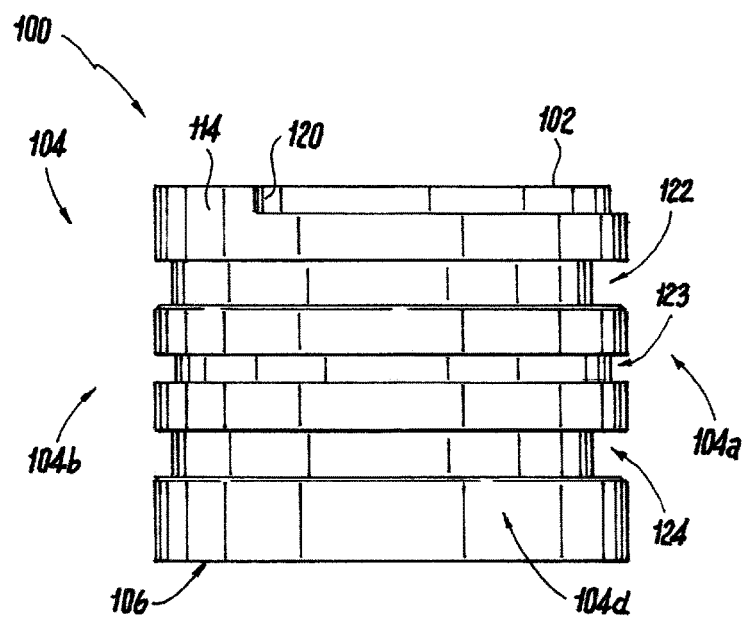
FIG. 3 is a side view of FIG. 1, showing the eccentric seal grooves.

Referring to FIG. 3, a first groove 122 within the side face 104 located between the top face 102 and the bottom face 106 with variable depth into the bottom face is meant to receive a seal. The depth variance into the side face is preferred to be between 0.0002 and 0.01 inches. The depth of the groove along the first straight section 104a is greater than the depth along the second straight section 104b. The depth of the groove along each of the rounded sections 104c/d increases from the second straight section 104b to the first section 104a. The first groove 112 is located in the top half of the top face 102 and encircles the entire side face 104a. The side face 104 also includes a second variable seal groove 124 having a located below the first seal groove 122. The eccentricity of the two seal grooves 122 and 124 help avoid tipping and alignment issues. When a seal 101 having a constant width is positioned within the first groove, the seal groove helps ensure a predetermined contact area between the housing bores and the bearing. This helps designers align the centerlines of the driveline, pump bores, and bearing bores during the design phase.

Figure 4:
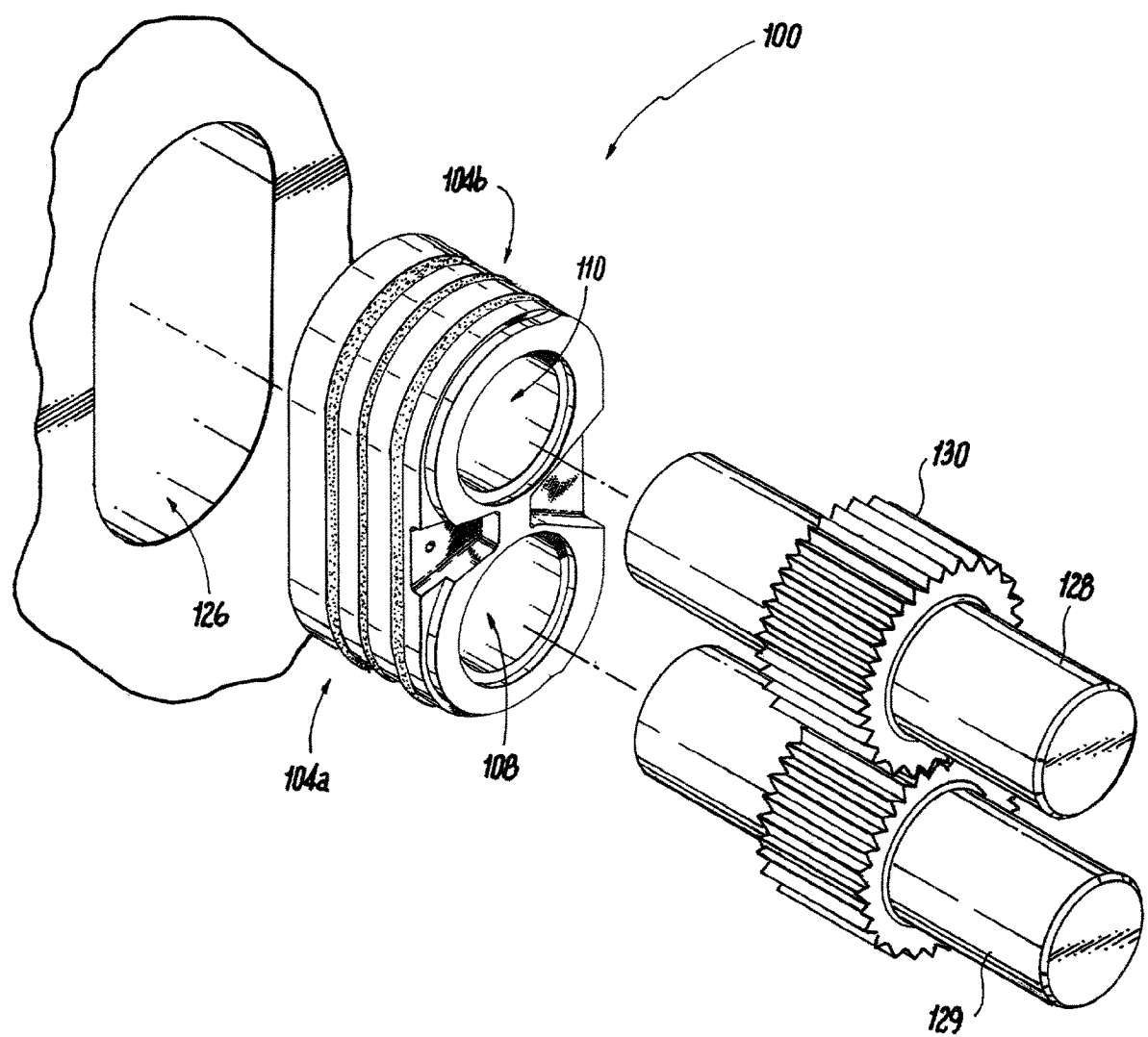
FIG. 4 is a perspective view of a pump bearing including shafts and gears.
Figure 5:
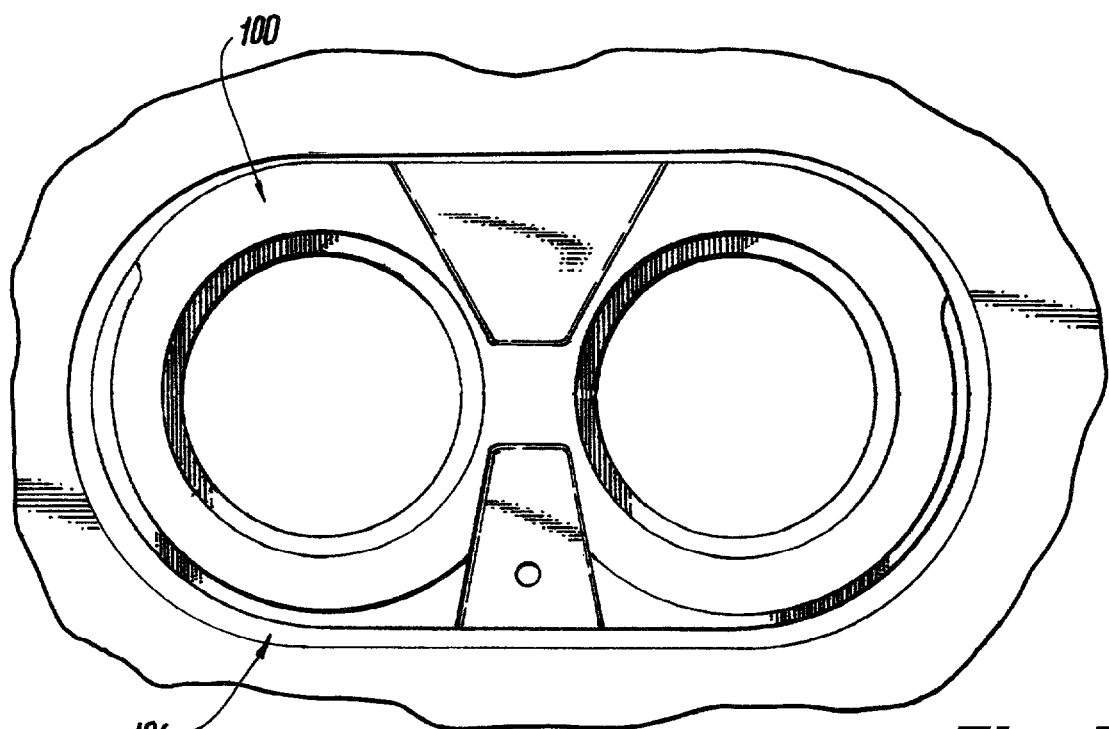
FIG. 5 is a top view of the bearing of FIG. 1, in the housing in an unloaded condition.
Figure 6:
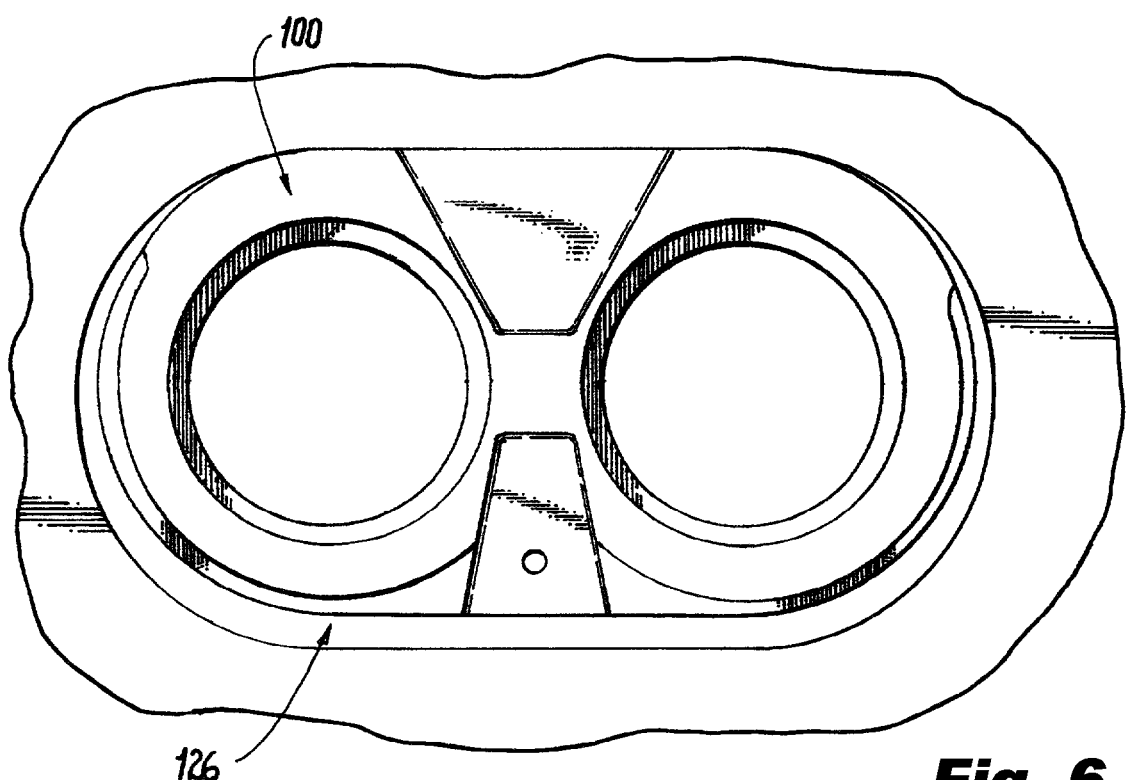
FIG. 6 is a top view of the bearing of FIG. 1, in the housing in a loaded condition.

Referring to FIG. 4, fuel pump bearing 100 resides in a housing 126, a drive shaft 128 extends through the first bore 110 and a driven shaft 129 extends through the second bore 108 and a gear 130 located on each of the on each of the shafts 128/129. As shown in FIG. 5, the fuel pump bearing 100 is partially biased to an inlet side of the housing 100 in an unloaded condition due to the seal grooves 122 and 124. The eccentric seal grooves 122 and 124 bias the bearing 100 to the housing wall on the drive side using the spring-like quality of the seal material before operation begins and during start to help aid in alignment. Further, before operating, as shown in FIG. 5, the asymmetric pressure balance grooves 112 are not contributing because there is no pressure across the bearings. As shown in FIG. 6, the fuel pump bearing is fully biased to the inlet side of the housing 126 in a loaded condition. The asymmetric pressure balance groove 112 biases the bearing to the housing wall on the drive side by directing the resultant pressure load from the pressures acting on the pump during operation as shown in FIG. 6. The resultant pressure loads developed by pumping the fluid are directed toward a given spot by controlling how far the pressure balance groove extends along the outer perimeter of the bearing. The resultant combined asymmetric hydraulic load can thus be directed so as to push the bearing towards the desired contact point within the housing. The eccentric seal groove 122 and the asymmetric balance groove 112 discussed above can also be applied independently to conventional two piece bearings and to single piece bearings.

The methods and systems of the present disclosure, as described above and shown in the drawings provide for pump bearings with superior properties including increased reliability and stability. While these concepts are both targeted towards aerospace fuel pumping applications, both are applicable to other pumps regardless of the fluid used or the end use of the pumps. While the apparatus and methods of the subject disclosure have been shown and described with reference to specific embodiments, those skilled in the art will readily appreciate that changes and/or modifications, such as reversing the positions of the first and second bearing bores, may be made thereto without departing from the spirit and scope of the subject disclosure.

What is claimed is:

1. A pump bearing comprising:
   a top face;
   a side face peripherally surrounding the top face;
   a bottom face opposed to the top face;
   a first bearing bore extending from the top face to the bottom face;
   an edge defined where the top face meets the side face; and
   a pressure balance groove defined within a portion of the edge of the top face and the side face defining first depth from the top face, wherein the pressure balance groove comprises a first groove portion that surrounds an angular portion of the first bearing bore and a second groove portion that surrounds an angular portion of the second bearing bore, wherein the surrounded angular portion of a second bearing bore is longer than the surrounded angular portion of the first bearing bore.

2. The bearing of claim 1, further comprising the second bearing bore parallel to the first bore.

3. The bearing of claim 1, wherein the top face is elongated along a primary axis.

4. The bearing of claim 1, wherein the top face includes a pair of grooves having a depth greater than the first depth of the pressure groove.

5. The bearing of claim 1, wherein the pressure groove surrounding the angular portion of the first bearing bore extends to 30 degrees with respect to a centerline of the top face in one of a clockwise or counter-clockwise direction.

6. The bearing of claim 5, wherein the pressure groove surrounding the angular portion of the first bearing bore extends greater than 30 degrees with respect to a centerline of the top face in the other of the clockwise or counter-clockwise direction.

7. The bearing of claim 1, wherein the pressure groove surrounding the angular portion of the second bearing bore extends beyond 30 degrees with respect to a centerline of the top face in one of a clockwise or counter-clockwise direction, and greater than 30 degrees in the other of the clockwise or counter-clockwise direction.

8. The bearing of claim 1, wherein the pressure groove surrounding the angular portion of the second bearing bore extends between 2 and 5 degrees further with respect to a centerline of the top face in one of a clockwise or counter-clockwise direction than the pressure groove surrounding the angular portion of the first bearing bore extends with respect to the centerline of the top face in the other of the clockwise or counter-clockwise direction.

9. The bearing of claim 1, wherein the pressure groove surrounding the portion of the second bearing bore includes a tapered end.

10. The bearing of claim 9, wherein the pressure groove surrounding the portion of the first bearing bore includes a tapered end.

11. The bearing of claim 1, wherein the first bearing bore and the second bearing bore are centered about a centerline of the top face.

12. The bearing of claim 1, wherein the side face includes a seal groove having a constant depth.

13. The bearing of claim 12, wherein the side face includes a seal groove having a variable depth.

14. A pump bearing system comprising:
a pump bearing including:
a top face;
a side face peripherally surrounding the top face;
a bottom face opposed to the top face;
a first bearing bore extending from the top face to the bottom face;
a second bearing bore parallel to the first bore
an edge defined where the top face meets the side face; and
a pressure balance groove defined within a portion of the edge of the top face and the side face defining first depth from the top face, wherein the pressure balance groove comprises a first groove portion that surrounds an angular portion of the first bearing bore and a second groove portion that surrounds an angular portion of the second bearing bore, wherein the surrounded angular portion of the second bearing bore is longer than the surrounded angular portion of the first bearing bore;
a housing for housing the fuel pump bearing;
a drive shaft extending through the first bore and a driven shaft extending through the second bore; and
a gear located on each of the drive shafts.

15. The bearing of claim 14, wherein the side face includes a seal groove located between the top face and the bottom face having a constant depth.

16. The bearing of claim 15, wherein the side face includes a seal groove located between the top face and the bottom face having a variable depth, wherein the variability is perpendicular to the side face.

* * * * *